United States Patent
Parish et al.

(10) Patent No.: US 9,443,494 B1
(45) Date of Patent: Sep. 13, 2016

(54) GENERATING BOUNDING BOXES FOR LABELS

(71) Applicant: Amazon Technologies, Inc., Reno, NV (US)

(72) Inventors: Scott Robert Parish, North Bend, WA (US); Clayton Matthew Magouyrk, Seattle, WA (US); David Adam Edelstein, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 197 days.

(21) Appl. No.: 14/135,306

(22) Filed: Dec. 19, 2013

(51) Int. Cl.
*G09G 5/00* (2006.01)
*G09G 5/373* (2006.01)

(52) U.S. Cl.
CPC .................................... *G09G 5/373* (2013.01)

(58) Field of Classification Search
None
See application file for complete search history.

(56) References Cited

U.S. PATENT DOCUMENTS

| | | | | |
|---|---|---|---|---|
| 6,091,424 A | * | 7/2000 | Madden | G06T 11/206 345/619 |
| 2003/0229441 A1 | * | 12/2003 | Pechatnikov | G01C 21/26 701/411 |
| 2005/0137791 A1 | * | 6/2005 | Agrawala | G01C 21/367 701/454 |
| 2006/0058949 A1 | * | 3/2006 | Fogel | G01C 21/3673 345/629 |
| 2010/0097399 A1 | * | 4/2010 | Rajagopalan | G01C 21/3673 345/636 |
| 2013/0325343 A1 | * | 12/2013 | Blumenberg | G01C 21/3611 701/533 |
| 2014/0354629 A1 | * | 12/2014 | Adlers | G06T 3/60 345/419 |

OTHER PUBLICATIONS

Been, Ken, Eli Daiches, and Chee Yap. "Dynamic map labeling." Visualization and Computer Graphics, IEEE Transactions on 12.5 (2006): 773-780.*

* cited by examiner

*Primary Examiner* — Xiao Wu
*Assistant Examiner* — Yu Chen
(74) *Attorney, Agent, or Firm* — Ilan Barzilay; Seyfarth Shaw LLP

(57) ABSTRACT

A computing device can receive, from a map search system and in response to a map search query, map data that describes a geographic region. Each map label includes one or more text characters. A respective bounding box for each map label that is defined by an aspect ratio having a width and a height can be generated. The width of the bounding box is twice that of the height of the bounding box and an area for the bounding box is the same as an area for the map label. Map labels can be selected for display in an interactive geographic map. The interactive geographic map that displays the selected map labels that each describes a feature that is located in the geographic region can be generated. Each selected map label is enclosed by a respective bounding box for the map label.

20 Claims, 8 Drawing Sheets

GENERATING BOUNDING BOXES FOR LABELS

BACKGROUND

Interactive geographic maps, e.g., maps provided by a web map service, can provide a visual representation of a geographic region. An interactive geographic map for a particular geographic region can also describe various features that appear in the particular geographic region. For example, an interactive geographic map can describe line features, e.g., roads and rivers, area features, e.g., countries, parcels, forests, and lakes, and point features, e.g., villages and cities. Each feature in an interactive geographic map can be labeled, e.g., annotated, by positioning, near the feature and in the interactive geographic map, one or more labels, e.g., map labels, that describe the feature. For example, an interactive geographic map that includes a point feature referencing the city of San Francisco can be labeled by placing a label "San Francisco" near the point feature.

Computerized methods can be used to automatically position respective labels near features in an interactive geographic map. Such computerized methods can be configured to label features in an interactive geographic map based on predefined rules, e.g., repeat labels for roads or place labels for point features in a position that is located northwest direction of the point features. These computerized methods can also apply various algorithms, e.g., simulated annealing, genetic algorithms, etc., to optimize the placement of labels for features in an interactive geographic map. For example, various algorithms can be applied to position labels in an interactive geographic map in a manner that avoids overlap with other labels.

Since the size of labels can vary, each label is generally enclosed by a bounding box, e.g., a polygon, which defines how a label will be rendered in a geographic map. For example, instead of displaying a label for "Ride the Geese of Seattle at Lake Union" on one line, a smaller bounding box can be used to fit the label so the label is displayed across two lines. Defining the size, e.g., width, of a bounding box can affect how labels are rendered in a geographic map. For example, defining a too large of a width for a bounding box can result in some labels, e.g., "Lake Union Park Hotel" being displayed on a single line. Similarly, defining too small of a width for a bounding box can result in some labels, e.g., "Ride the Geese of Seattle at Lake Union" being displayed across too many lines.

Moreover, bounding boxes are can also have a specified respective buffer that is used to help identify collisions between rendered labels. For example, a collision can be identified when respective buffers for two rendered labels overlap. Upon collision, at least one of the two labels will no longer be displayed in an interactive geographic map.

BRIEF DESCRIPTION OF THE DRAWINGS

Various embodiments in accordance with the present disclosure will be described with reference to the drawings, in which.

DETAILED DESCRIPTION

Figure 1:
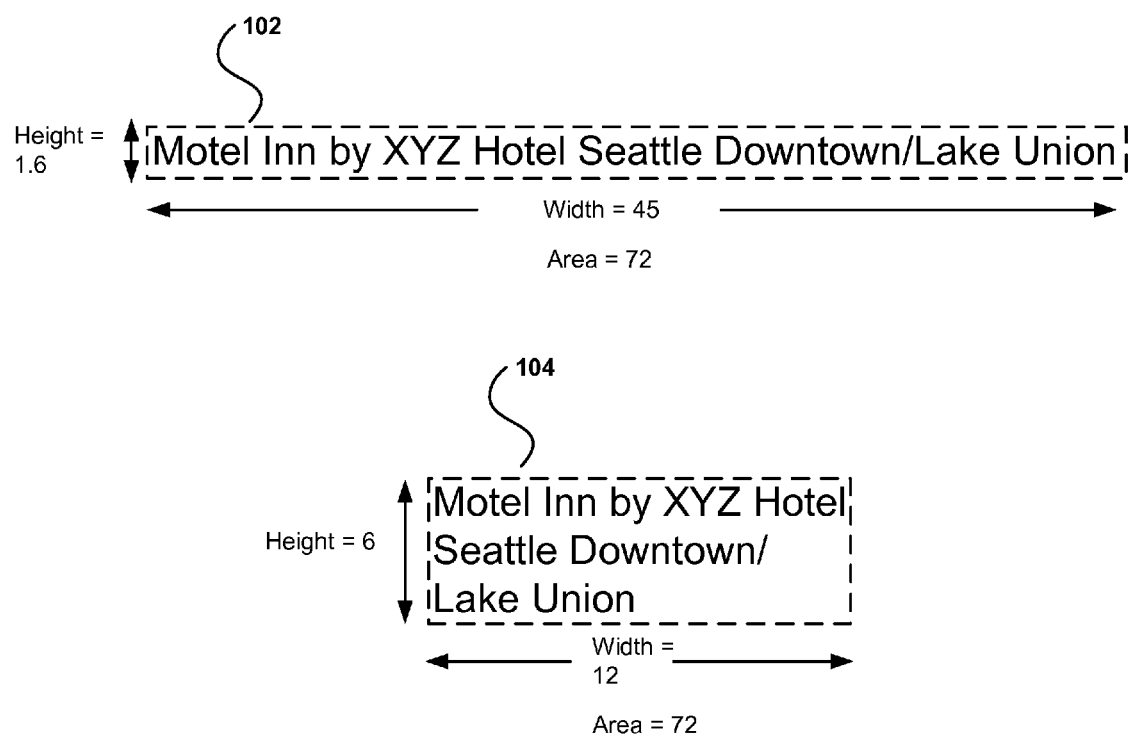
FIG. 1 illustrates an example bounding box that was generated for a label.

Systems and methods in accordance with various embodiments of the present disclosure overcome one or more of the above-referenced and other deficiencies in conventional approaches to displaying labels in an interactive geographic map. In particular, various embodiments of the present disclosure can provide a method for altering the display of labels in an interactive geographic map by generating dynamic bounding boxes for the labels. Additionally, various embodiments of the present disclosure can provide a method for reducing collisions between labels that were displayed in a previously drawn frame for an interactive geographic map.

As described above, bounding boxes can be used to define how a label, will be rendered in a geographic map. That is, when being rendered, a label is fitted, for example, using a wrapping algorithm, e.g., line wrapping or word wrapping, to be displayed within a perimeter that is defined by a bounding box. In some embodiments, bounding boxes for map labels can be dynamically generated to reduce the circumference that a label occupies when displayed in a geographic map. The dynamically generated bounding box can also be sized using an aspect ratio that results in labels being displayed in a consistent and a visually pleasing format. As used in this specification, a label is defined as a text label that can include one or more characters, one or more words, or both. Some examples of characters include letters, numerical digits, punctuation marks, e.g., periods and hyphens, and whitespace.

Thus, in various embodiments, bounding boxes for labels can be dynamically generated based on a specified aspect ratio. For example, the bounding boxes for labels can be dynamically generated based on an aspect ratio in which the width of the bounding box is twice the height of the bounding box, e.g., a 2:1 ratio. A bounding box for a label, e.g., "Ride the Geese of Seattle" can be dynamically generated by determining a width and height for the label.

A label area for the label can be determined using the width and height of the label. This area generally defines the amount of space that is needed to render the label on a geographic map. A bounding box with the specified aspect ratio can be dynamically generated by generating a polygon, e.g., a rectangle, having a respective height and width that satisfies the specified aspect ratio and has the same area as the label area that was determined above.

Once the bounding box has been generated, one or more generally known techniques for wrapping can be applied to fit the label within the bounding box. In response, the wrapping algorithm can provide a formatting, e.g., line wrapping, for the label within the generated bounding box. Once the bounding box and formatting for the label have been determined, the label can be fitted within the bounding box and rendered on a geographic map, e.g., an interactive geographic map.

Each bounding box that is generated for a label can also be assigned a buffer space ("initial buffer space") that defines a region surrounding the bounding box. This region generally identifies a space that surrounds the bounding box within which other labels should not be placed. Computerized methods for automatically placing labels in a geographic map can be configured to evaluate the respective buffer spaces for the labels to identify collisions as determined, for example, when there is an overlap of the respective buffer spaces for the labels. When a collision is detected two map labels, the computerized methods are can be configured to prevent at least one of the two labels from being displayed in the geographic map. In other words, the buffer provides a way to prevent labels from colliding, e.g., overlapping, with one another and, as a result, help increase the readability of a geographic map.

There may be instances where the buffer spaces that are used for certain map labels are larger than what is needed to prevent collisions. In such instances, when a user interacts with a map, for example, by zooming out, panning, or rotating the map, certain labels that were displayed in a previously drawn frame will collide and, as a result, some of the labels from the previously drawn frame will not be displayed in the new frame. This can make it more difficult for a user to learn more about features that were displayed in a previously drawn frame but are no longer displayed in subsequent frames due to a collision.

To address this issue, the initial buffer spaces for map labels that were displayed in a previously drawn frame for an interactive geographic map can be dynamically adjusted, e.g., reduced, as described below.

One advantage of dynamically generating bounding boxes using a specified aspect ratio is that users, e.g., cartographers, have greater control over how an interactive geographic map for a particular geographic region will be rendered. For example, a cartographer can configure a system to display map labels in bounding boxes that are sized using a specified aspect ratio. As a result, the circumference of the labels, when rendered in a geographic map, can be reduced. The labels are also fitted in bounding boxes that follow a consistent aspect ratio, which can help increase readability and the visual aesthetics of a geographic map.

Further, by dynamically reducing buffer spaces for certain labels, e.g., labels displayed in previously drawn frames for a geographic map, it is possible to reduce the likelihood of collisions for those labels in subsequently drawn frames for the map and, as a result, increase the likelihood that such labels will be selected for display in the subsequently drawn frames.

Other advantages, variations, and functions are described and suggested below as may be provided in accordance with the various embodiments.

FIG. 1 illustrates an example bounding box 104 that was generated for a label 102. As described in this specification, in various embodiments, bounding boxes for labels can be dynamically generated based on a specified aspect ratio. For example, a system, e.g., the map search system 505, can be configured to generate bounding boxes for labels using a ratio in which the width of the bounding box is twice the height of the bounding box, e.g., a 2:1 ratio. The system can be configured to generate bounding boxes using other aspect ratios. In some embodiments, the aspect ratio used to generate bounding boxes can be dynamically adjusted in response to a change in the zoom level of a map, the content of the label for which the bounding box is being generated, or the amount of space that is available in the map to display the label.

In FIG. 1, a label "Motel Inn by XYZ Hotel Seattle Downtown/Lake Union" is shown having a height of 1.6 units and a width of 45 units. The label also has an area of 72. The height, width, and area for the label can be determined using the techniques described in reference to FIG. 5.

FIG. 1 also shows a bounding box 104 that was generated for the label 102 using the techniques described in this specification. Bounding boxes can be used to define how a label will be rendered in a geographic map. In FIG. 1, the bounding box 104 was generated using a specified aspect ratio in which the width of the bounding box, e.g., 12, is twice that of the height of the bounding box, e.g., 6. In particular, the bounding box 104 was sized so that the area of the bounding box 104 is the same as the area of the label 102, e.g., 72. The area of the bounding box 104 is sized to be the same as the area of the label 102 to ensure that the label 102 will fit in the bounding box 104. A formatting for the label was obtained using a wrapping algorithm to fit the label within the bounding box 104. Thus, in FIG. 1, the label is shown in the bounding box 104 as spanning three lines.

Figure 2:
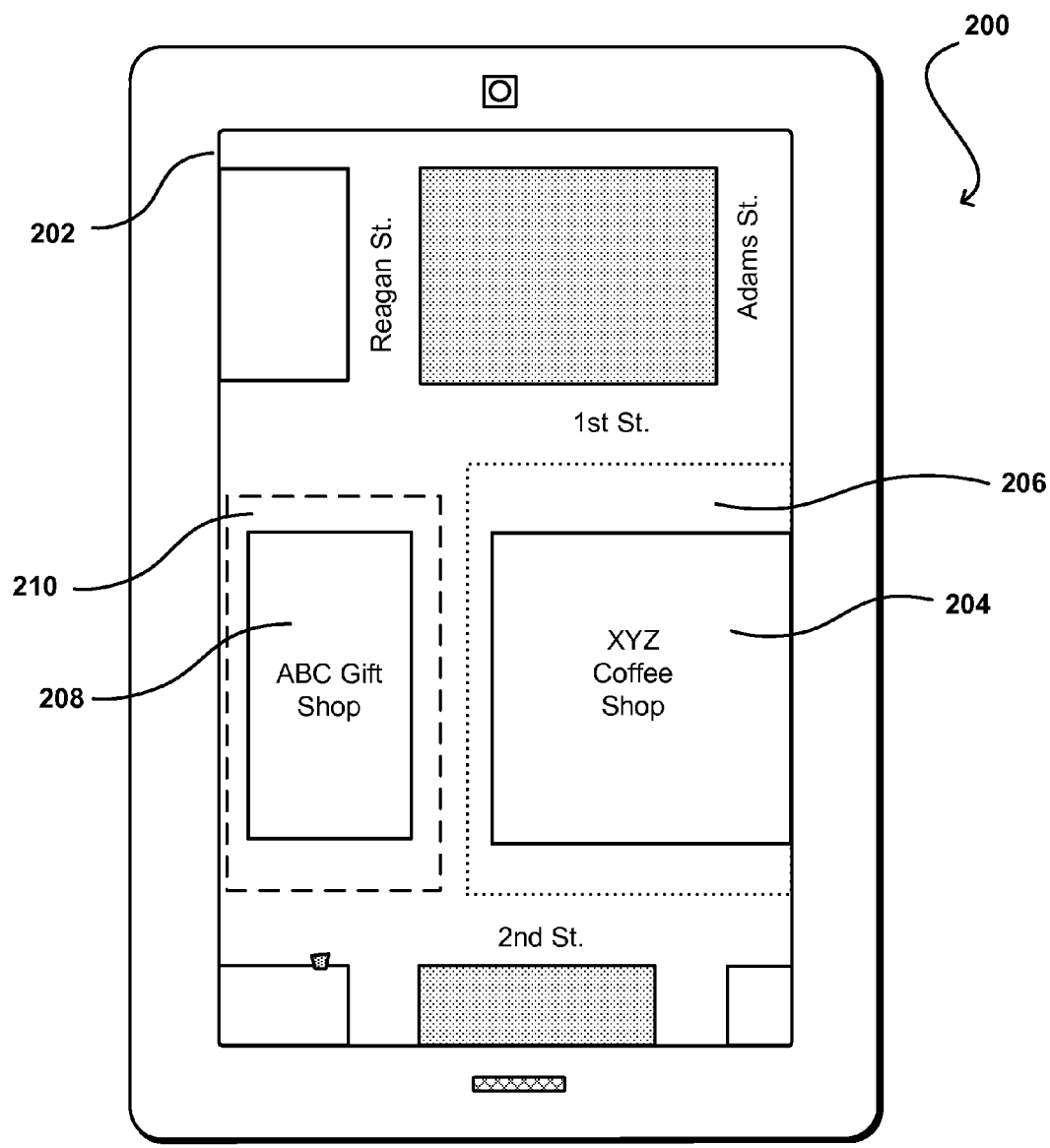
FIG. 2 illustrates an example frame for an interactive geographic map that illustrates respective initial buffer spaces for a first label and a second label.

FIG. 2 illustrates an example frame 202 for an interactive geographic map that illustrates respective initial buffer spaces 206 and 210 for a first label 204 and a second label 208. The frame 202 is displayed on a display screen of a computing device 502. The frame 202 was rendered using, for example, map data that was received from a map search system 505, as described in reference to FIG. 5. The frame 202 displays a first label 204 for a first feature and a second label 208 for a second feature.

As described in this specification, each bounding box for a label can have a buffer space ("initial buffer space") that defines a region surrounding the bounding box. This region generally identifies a space that surrounds the bounding box within which other labels should not be placed. FIG. 2 illustrates an initial buffer space 206 that corresponds to a bounding box for the first label 204 and an initial buffer space 210 that corresponds to a bounding box for the second label 208. In FIG. 2, the respective initial buffer spaces 206 and 210 do not overlap, e.g., collide, and, as a result, both the first and second labels 204 and 208 are displayed in the frame 202.

Figure 3:
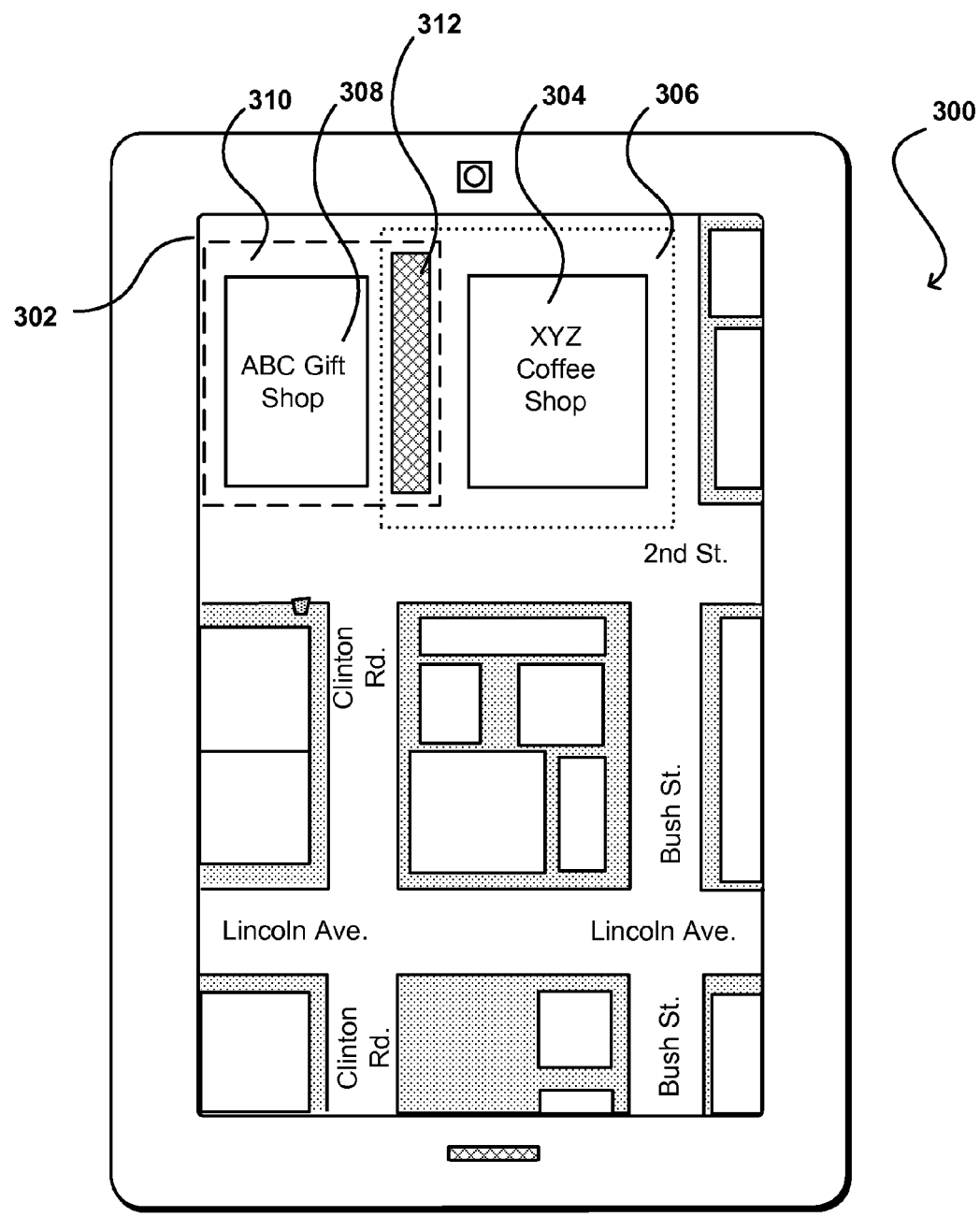
FIG. 3 illustrates an example frame for an interactive geographic map that illustrates a collision between respective initial buffer spaces for a first label and a second label.

FIG. 3 illustrates an example frame for an interactive geographic map 302 that illustrates a collision 312 between respective initial buffer spaces 306 and 310 for a first label 304 and a second label 308. The frame 302 is displayed on a display screen of a computing device 502. The frame 302 was rendered using, for example, map data that was received from a map search system 505, as described in reference to FIG. 5.

For example, the frame 302 can be generated when a user zooms out of the frame 202, as described in reference to FIG. 2. As a result of zooming out, the first and second labels 304 and 308 have moved closer together and, consequently, their initial buffer spaces 306 and 310 have overlapped, thereby creating a collision 312 between the initial buffer spaces 306 and 310 for the first and second labels 304 and 308. In such instances, one, or both, of the first and second labels 304 and 308 can be prevented from being displayed in the frame 302. Since both the first and second labels were displayed in a previously drawn frame for the interactive geographic map, removing one or both of the labels from the frame 302 can be undesirable, as described above. To help prevent this from happening, reduced buffer spaces can be used to determine whether labels that were drawn in a previous frame collide, as illustrated in FIG. 4.

Figure 4:
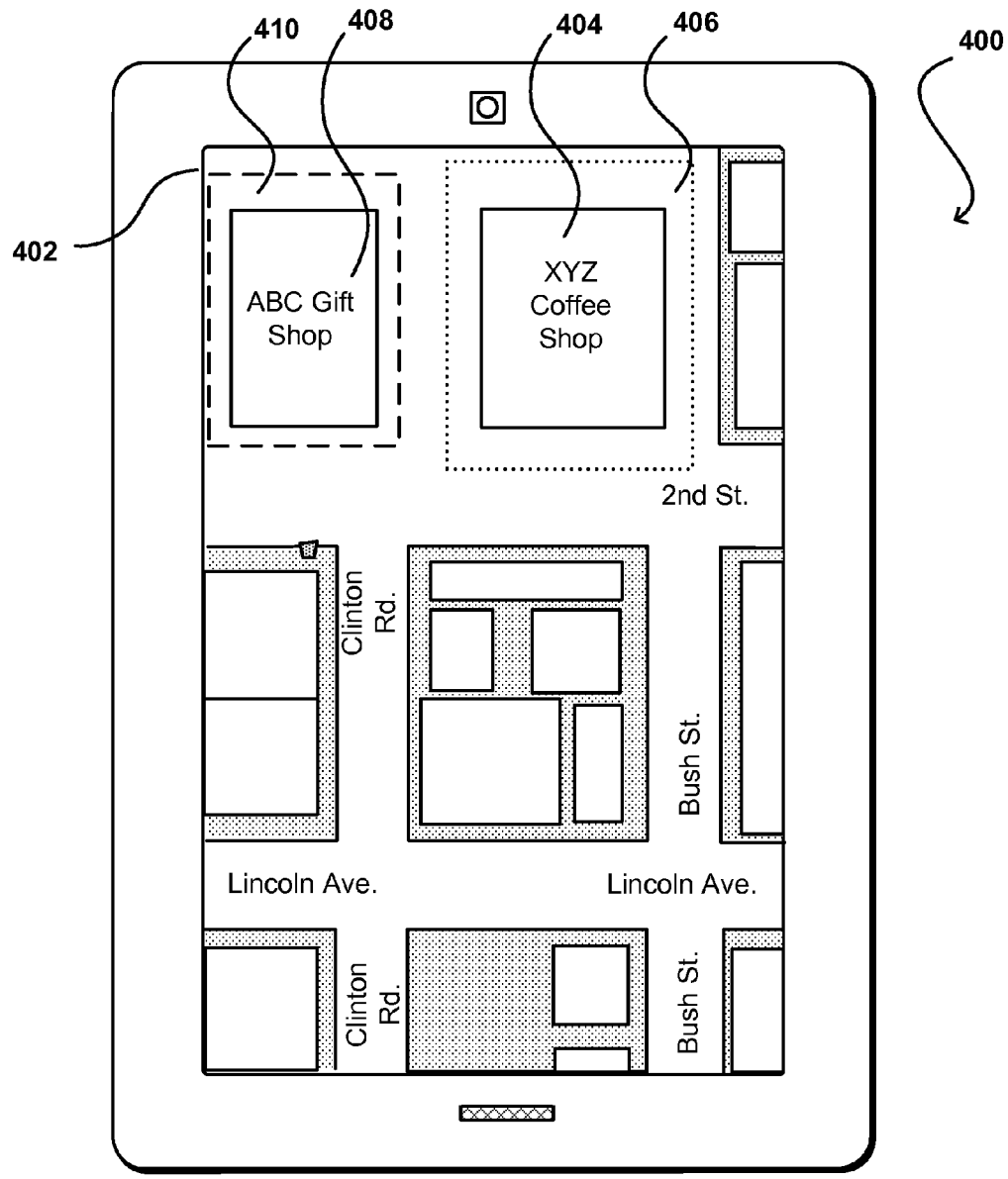
FIG. 4 illustrates an example frame for an interactive geographic map that illustrates respective reduced buffer spaces for a first label and a second label that were displayed in a previously drawn frame.

FIG. 4 illustrates an example frame 402 for an interactive geographic map that illustrates respective reduced buffer spaces for 406 and 410 a first label 404 and a second label 408 that were displayed in a previously drawn frame. The frame 402 is displayed on a display screen of a computing device 502. The frame 402 was rendered using, for example, map data that was received from a map search system 505, as described in reference to FIG. 5.

The frame 402 illustrates how a collision between a first label 406 and a second label 410 that was described in reference to FIG. 3 can be prevented in certain situations using reduced buffer spaces 406 and 410. In some embodiments, when a label was displayed in a previous drawn frame, a second buffer space ("reduced buffer space") for the label is generated by reducing its initial buffer space. The initial buffer space can be reduced, for example, by a cartographer specified percentage, e.g., 20 percent.

In FIG. 4, both the first label 404 and the second label 408 were displayed in a previously drawn frame for the interactive geographic map. As a result, respective reduced buffer spaces for the first and second labels are used to determine whether placement of the first and second labels results in a collision. As shown in FIG. 4, both the first label 404 and the second label 406 can be displayed because there is no overlap of their respective reduced buffer spaces.

Figure 5:
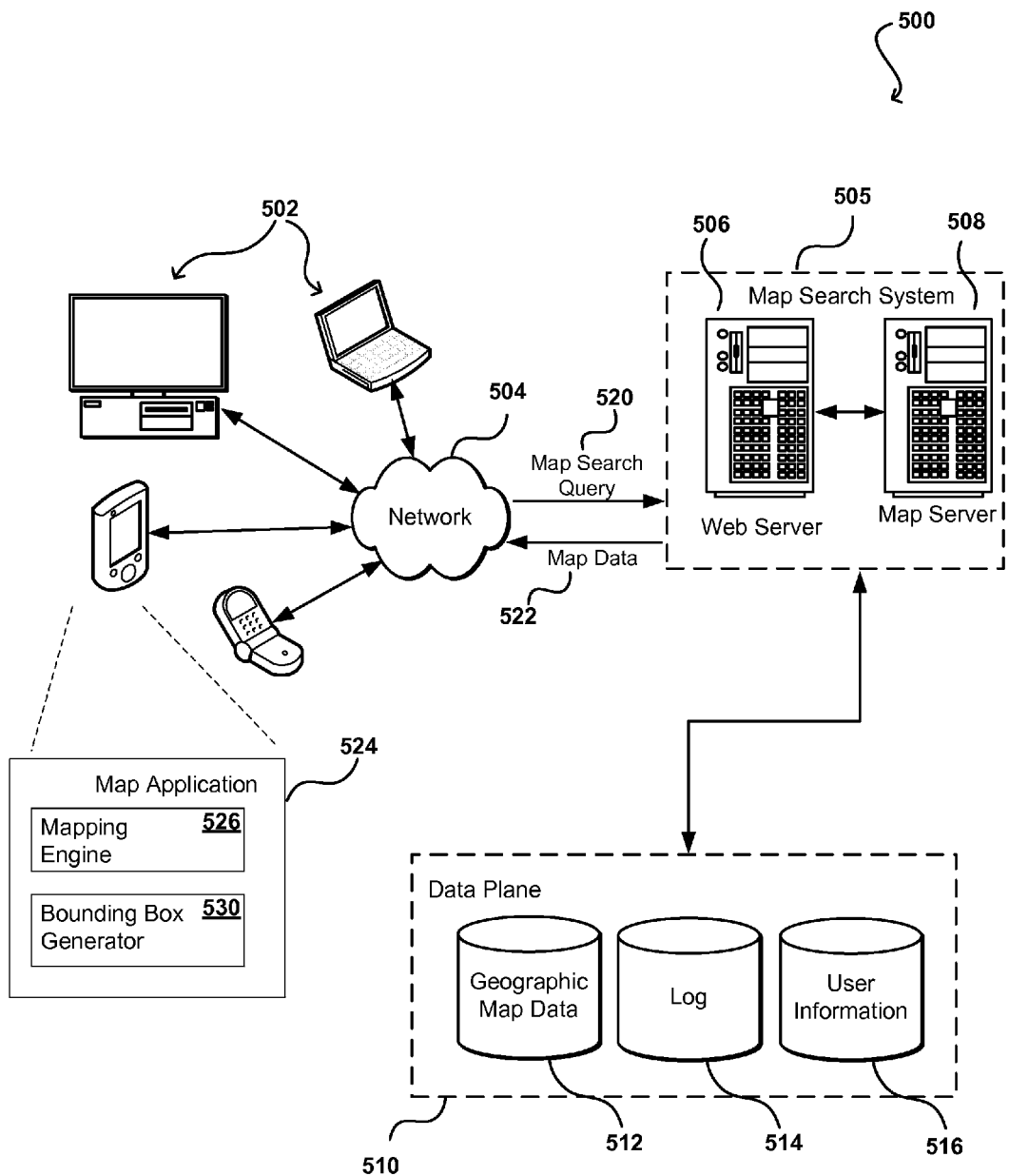
FIG. 5 illustrates an example of an environment for implementing aspects in accordance with various embodiments.

FIG. 5 illustrates an example of an environment 500 for implementing aspects in accordance with various embodiments. Although a web-based environment is described for purposes of explanation, different environments may be used, as appropriate, to implement various embodiments.

The example environment 500 includes a map search system 505 and a data plane 510. The map search system 505 includes at least one web server 506 and at least one map server 508, as described below. The map search system 505 is an example of an interactive geographic map retrieval system implemented as computer programs on one or more computers in one or more locations, in which the systems, components, and techniques described below can be implemented.

A user can interact with the map search system 505 through a client device 502. For example, the client device 502 can be a computer coupled to the map search system 505 through a data communication network 504, e.g., the Internet. In some instances, the map search system 505 can be implemented on the client device 502, for example, through a software application executing on the client device 502. The client device 502 generally includes a memory, e.g., a random access memory (RAM), for storing instructions and data, and a processor for executing stored instructions. The client device 502 can be any appropriate device operable to send and receive requests, messages, or other types of information over the network 504. The client device 502 can also include a display screen though which a user interacting with the client device can view information, e.g., interactive geographic maps. Some examples of client devices include personal computers, cellular phones, handheld messaging devices, laptop computers, set-top boxes, personal data assistants, electronic book readers, tablet devices, and the like.

The network 504 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 502 can communicate over the network using wired or wireless connections, and combinations thereof.

A user can use the client device 502 to submit a map search query 520 to the map search system 505. The map search query 520 can request an interactive geographic map for a particular geographic region that is identified by a geographic address, e.g., a street address, city, state, zip code, geographic coordinates, or a name of a point of interest. When the user submits the map search query 520, the query 520 may be transmitted through the network 504 to a map server 508 within the map search system 505. The map server 508 responds to the query 520 by using, for example, the geographic map data 512, to identify map data 522 describing a geographic region that satisfies the query 520. The map server 508 sends the map data 522 through the network 504 to the client device 502 for presentation to the user.

The map data 522 can include data describing a map of the particular geographic region. The map data 522 can be used, for example, by a client device 502, to generate an interactive geographic map that provides a visual, e.g., two-dimensional or three-dimensional, representation of the particular geographic region.

The map data 522 can describe the map of the particular geographic region using, for example, a collection of map tiles at a specified zoom level. For example, in response to a map search query for the city of San Francisco, the map server 508 can identify a collection of map tiles that collectively describe a map of the city of San Francisco at a specified zoom level. Each map tile in the collection visually describes a portion of the map of San Francisco at the specified zoom level. Different types of maps of a geographic region may be provided depending on the user's selection including, for example, road maps, satellite maps, a hybrid maps, e.g., a combination of normal and satellite views, or physical maps based on terrain information.

Further, the map data 522 can also include a collection of labels, e.g., text labels, icons, or both, for the requested geographic region. Each label can describe a feature that is located in the requested geographic region. Some examples of features include line features, e.g., roads and rivers, area features, e.g., countries, parcels, forests, and lakes, and point features, e.g., cities and points of interest. The map data 522 can also include, for each label, respective coordinates that specify a location at which the label is to be positioned in an interactive geographic map. Coordinates for labels can be specified by a user, e.g., a cartographer, or may be generated by the map server 508. For example, a label "San Francisco" can be assigned coordinates so that the label is positioned in a centrally located map tile in a collection of map tiles for the city of San Francisco.

In some embodiments, the map server 508 generates respective popularity scores for labels that correspond to a particular geographic region. For example, the map server 508 can generate popularity scores based on an amount of overlap between labels and graphical features or cartographic preferences among potential label positions. A label's popularity score generally indicates the popularity of the label for a particular geographic region. For example, a building in a particular geographic region may have a label "Coffee Shop" and "Gift Shop" that are each associated with the building. The label "Coffee Shop" may have a popularity score of 0.9 for the building while the label "Gift Shop" may have a popularity score of 0.5 for the building. When selecting which label to use to identify the building, the map server 508 can use the label "Coffee Shop" to identify the building, since this label has the higher popularity score. Label popularity scores can be used, for example, to prioritize the selection of labels to be displayed in an interactive geographic map. Generally, the higher the popularity score, the more relevant a label is to a particular geographic region. For example, businesses "ABC Inc.", "B2B Corp.", and "B2C P.C." can all be located in the same building in a particular geographic region. Each business can have a respective label that describes the business and a respective popularity score associated with the label. For example, labels for the businesses "ABC Inc.", "B2B Corp.", and "B2C P.C." can be respectively scored 0.7, 0.4, and 0.8. When generating an interactive geographic map for the particular geographic region, the client device 502 can evaluate the respective scores associated with the labels to select labels for display in the interactive geographic map. In the example above, the client device 502 selects the label "B2C P.C." for display at the building's location in the interactive geographic map, since that label has the highest popularity score.

After receiving the map data 522 from the map server 508, and through the network 504, a software application, e.g., web browser or a map application 524, running on the client device 502 renders an interactive geographic map for the requested geographic region using the map data 522. For example, a mapping engine 526 in the map application 524 can position map tiles, in a collection of map tiles describing the requested geographic region, for display on a display screen of the client device 502. Additionally, the mapping engine 526 can evaluate the map data 522 to select labels to be displayed in the interactive geographic map. As described above, the mapping engine 526 can select labels for display based on the respective popularity scores for the labels.

In some embodiments, map application 524 includes a bounding box generator 530 that is configured to generate respective bounding boxes for labels based on a specified aspect ratio. In some embodiments, the aspect ratio is defined by a rectangle having a width that is twice the height of the rectangle, e.g., a 2:1 ratio, as described in reference to FIG. 2.

When generating a bounding box for a particular label, the bounding box generator 530 determines a label area for the particular label. The label area defines the amount of space that is needed to render the particular label on a geographic map. A bounding box for the particular label is then generated by sizing the bounding box so that the bounding box satisfies the specified aspect ratio and has an area that is the same as the label area for the particular label. That is, in some embodiments, the bounding box has a width that is twice the height of the bounding box and has an area that is the same as the label area for the particular label.

A label area for the particular label can be determined by determining a product of, e.g., multiplying, a width and a height of the particular label. In some embodiments, the bounding box generator 530 is configured to determine the width of a label by measuring a respective width for each character in the label. For example, a width for a label "City of SF" can be determining respective widths for the characters "C," "i," "t," "y," "o," "f," "S," and "F." In determining the respective widths for the characters, the bounding box generator 503 evaluates each character, for example, by measuring each character's width based on a font and font size with which the character will be rendered in a geographic map. Since whitespace can contribute to the overall width of the label, the bounding box generator 530 can also determine respective widths of whitespace, e.g., blank spaces, between characters or words in the particular label. Further, the width and height of each character in a label can be measured with respect to the character's case, e.g., uppercase or lowercase, as it appears in the label.

Once the respective widths for the characters in the particular label have been determined, the bounding box generator 530 determines a width for the particular label by computing a sum of the respective widths that were determined for the characters in the particular label. This sum includes the respective widths of whitespace in the particular label.

The bounding box generator 530 is also configured to determine a height for the particular label. In some embodiments, the bounding box generator 530 determines the height of a label by measuring a height of the largest, e.g., tallest, character in the particular label based on a font and font size with which the character will be rendered in a geographic map.

As described above, the bounding box generator 530 can generate a bounding box for the particular label by sizing the bounding box so that the bounding box satisfies the specified aspect ratio, e.g., has a width that is twice the height of the bounding box, and has an area that is the same as the label area for the particular label. Sizing the bounding box to fit these parameters can be accomplished using generally known techniques. For example, to determine the height of the bounding box, the bounding box generator 530 can divide the label area for the particular label by two and then determine a square root of that result. The width of the bounding box can be determined by multiplying the height by two.

Once the bounding box has been generated, the particular label can be fitted to be displayed within the bounding box. The bounding box generator 530 can fit the particular label to the bounding box by obtaining, from a wrapping algorithm, a formatting for the particular label that is based on a size of the bounding box. For example, a wrapping algorithm can be provided with one or more parameters that describe the generated bounding box, together with the particular label. In response, the wrapping algorithm can provide a formatting for the particular label that is based on a maximum number of lines of text that can fit within the bounding box and on the determined width of the particular label. The maximum number of lines of text that can fit within the bounding box can be determined by dividing the height of the bounding box by the height of the particular label.

Generally, wrapping algorithms attempt to best fit text within a bounding box using specified parameters, e.g., a maximum number of lines of text that can be fitted within the bounding box and a width of the bounding box. The formatting describes how the particular label will be fitted, e.g., wrapped, within the bounding box by specifying, for example, one or more locations within the particular label at which a line break is inserted. One example of a wrapping algorithm is the Knuth and Plass line-breaking algorithm.

The bounding box generator 530 can fit the particular label within the bounding box using the formatting for the particular label. The map application 524 can display the particular label in the interactive geographic map based on the label's generated bounding box and formatting.

In some embodiments, labels that describe polygon-shaped area features, e.g., lakes, can be fitted differently. For example, the bounding box generator 530 can be configured to fit a label for a polygon-shaped area feature in a bounding box that includes one line. The bounding box generator 530 can then determine whether the dimensions of the bounding box exceed the dimensions of the polygon-shaped area feature. If the dimensions of the bounding box exceed the dimensions of the polygon-shaped area feature, then the bounding box generator 530 can resize the bounding box to include two lines and can fit the label in the resized bounding box. Similarly, the bounding box generator can determine whether the dimensions of the resized bounding box exceed the dimensions of the polygon-shaped area feature. If the dimensions of the bounding box exceed the dimensions of the polygon-shaped area feature, then the bounding box generator 530 can resize the bounding box to include three lines and can fit the label in the resized bounding box. This process can be repeated recursively until the dimensions of the bounding box are within the dimensions of the polygon-shaped area feature.

As described above, each bounding box for a label can also be assigned a buffer space ("initial buffer space") that defines a buffer region that surrounds the bounding box. The bounding box generator 530 can be configured to generate an initial buffer space for a bounding box of a label by, for example, generating a rectangular region of a specified size that surrounds the bounding box of the label. The buffer region, e.g., the rectangular region, generally defines a space that surrounds the bounding box within which other labels are not to be placed. When buffer spaces for two labels overlap, e.g., collide, then at least one of the two labels can be prevented from being displayed in a geographic map.

There may be instances in which the overlapping of buffer spaces for two labels does not necessarily mean that that the labels themselves, e.g., text or an icon of the labels, are overlapping. For example, a first label "United States" may have an initial buffer space of 500 units and a second label "Texas" may have a smaller initial buffer space, e.g., 25 units. These labels may be placed in the same frame for an interactive geographic map. However, as a user zooms out of the map, the first and second labels will continue to move closer together and, at some point, the second label "Texas" will no longer be shown because the buffer spaces for the first and second label have collided. In this example, the first label "United States" is displayed over the second label "Texas" because the first label has a higher popularity score than the second label "Texas." This result can be frustrating for a user that was zooming out to learn more about the second label "Texas."

To reduce such collisions, in some embodiments, the bounding box generator 530 is configured to dynamically adjust the initial buffer space for bounding box that correspond to labels that were displayed in a previously drawn frame for an interactive geographic map.

For example, in some embodiments, when a label was displayed in a previously drawn frame, the bounding box generator 530 can generate a second buffer space ("reduced buffer space") for the label by reducing the label's initial buffer space. Depending on the implementation, the initial buffer space can be reduced, for example, by a specified numerical value or by a percentage, e.g., 20 percent.

In some embodiments, the mapping engine 526 can store data describing labels that can potentially be selected for placement in an interactive geographic map. The data describing the labels can include, for example, a respective initial buffer space for a label, a respective reduced buffer space for the label, and an indication of whether the label was displayed in a previously drawn frame for the interactive geographic map.

When selecting a first and second label to be displayed in a frame for an interactive geographic map, the mapping engine 526 can determine whether the first and second labels were displayed in a previously drawn frame for the interactive geographic map, for example, using the data describing labels.

In some embodiments, if the first and second labels were displayed in a previously drawn frame, then the mapping engine 526 attempts to place the first and second labels in the frame based on a comparison of a respective reduced buffer space for the first and second labels. That is, when placing the first and second labels in the frame, the mapping engine 526 determines whether the first and second labels collide based on an overlap of their respective reduced buffer spaces. The initial buffer spaces for the first and second labels are not considered in this situation. The mapping engine 526 can resolve collisions between the first and second labels, for example, by not displaying the label having the lower popularity score.

If one, or both, of the first and second labels were not displayed in a previously drawn frame, then the mapping engine 526 attempts to place the first and second labels in the frame based on a comparison of a respective initial buffer space for the first and second labels. That is, when placing the first and second labels in the frame, the mapping engine 526 determines whether the first and second labels collide based on an overlap of their respective initial buffer spaces. The reduced buffer spaces for either the first or second label, if such buffer spaces exist, are not considered in this situation.

In some embodiments, the bounding box generator 530 is configured to dynamically adjust the initial buffer space of a bounding box for a label based on a type, e.g., category, of feature being described by the label. For example, an initial buffer space for a label that describes a point feature, e.g., a city, can be reduced by a first specified percentage, e.g., 20 percent, while an initial buffer space for a label that describes an area feature, e.g., a lake, can be reduced by a second specified percentage, e.g., 30 percent.

In some embodiments, the bounding box generator 530 is configured to generate, for a label, an initial buffer space that defines a variable buffer region that surrounds the bounding box. For example, the bounding box generator 530 can generate a buffer space for a text label that has a larger buffer space region surrounding the front of the text label, e.g., the first character in the text label, and a smaller buffer space region surrounding the rear of the text label, e.g., the last character in the text label. This variable buffer space helps avoid placing labels near the front of a text label, which can result in the text label becoming more difficult to read on a geographic map, but can still allow placement of labels closer to the rear of the text label, which generally does not affect the readability of the text label.

In such embodiments, the bounding box generator 530 can generate reduced buffer spaces for the labels and can place such labels in a geographic map based on whether the labels were displayed in a previously drawn frame, as described above.

In some embodiments, the web server 506, map server 508, and similar components, can be considered to be part of the data plane 510. The handling of all requests and responses, as well as the delivery of content between the client device 502 and the map server 508, can be handled by the web server 506. The web server 506 and map server 508 are merely example components. However, more or fewer components can be used as structured code can be executed on any appropriate device or host machine as discussed elsewhere herein.

The data plane 510 includes one or more resources, servers, hosts, instances, routers, switches, data stores, other similar components, or a combination thereof. The resources of the data plane 510 are not limited to storing and providing access to data. Indeed, there may be several map servers, layers, or other elements, processes, or components, which may be chained or otherwise configured, and which can interact to perform tasks including, for example, obtaining data from an appropriate data store. As used in this specification, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 510 can include several separate data tables, databases, or other data storage mechanisms and media for storing data relating to a particular aspect. For example, the data plane 510 illustrated includes mechanisms for storing geographic map data 512 and user information 516, which can be used to serve content. The data plane 510 is also shown to include a mechanism for storing log data 514, which can be used for purposes such as reporting and analysis. The data plane 510 is operable, through logic associated therewith, to receive instructions from the map server 508 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 5. Thus, the system 500 in FIG. 5 is provided merely as one example, and does not limit the scope of the disclosure.

Figure 6:
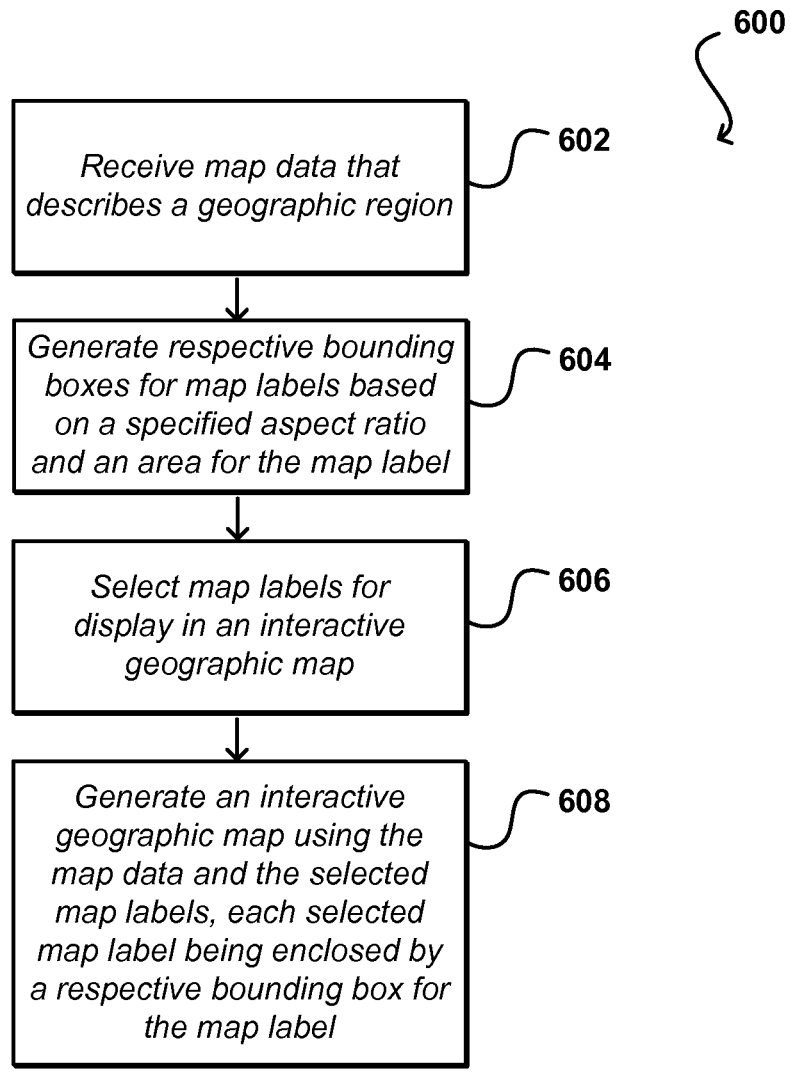
FIG. 6 is a flow diagram of an example process for generating bounding boxes for labels.

FIG. 6 illustrates an example process 600 for generating bounding boxes for labels. The example process 600 is provided merely as an example and additional or fewer steps may be performed in similar or alternative orders, or in parallel, within the scope of the various embodiments described in this specification.

A computing device receives, from a map search system and in response to a map search query, map data that describes a geographic region 602. The map data includes a collection of map labels that each describe a feature that is located in the geographic region. Each map label includes one or more text characters and is associated with a respective popularity score. The computing device generates, for each map label in the collection of map labels, a respective bounding box that is defined by an aspect ratio having a width and a height 604. In some embodiments, the width of the bounding box is twice that of the height of the bounding box and an area for the bounding box is the same as an area for the map label.

The computing device selects from the collection of map labels, one or more map labels for display in an interactive geographic map 606. The computing device generates, using the map data and the selected map labels, the interactive geographic map that describes a visual representation of a map for the geographic region 608. The interactive geographic map displays the selected map labels that each describe a feature that is located in the geographic region an each selected map label is enclosed by a respective bounding box for the map label.

Figure 7:
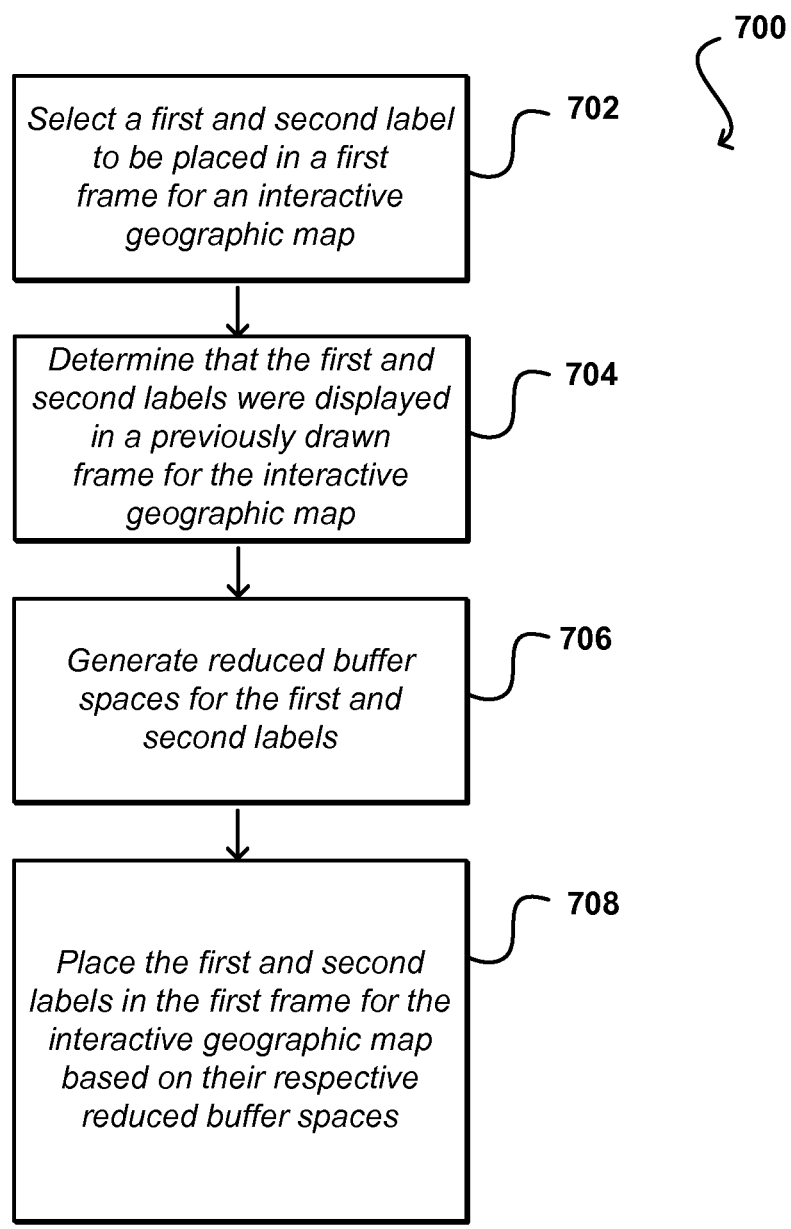
FIG. 7 is a flow diagram for an example process for placing labels based on a reduced buffer space.

FIG. 7 is a flow diagram for an example process for placing labels 700 based on a reduced buffer space. The example process 700 is provided merely as an example and additional or fewer steps may be performed in similar or alternative orders, or in parallel, within the scope of the various embodiments described in this specification.

A computing device selects a first and second label to be placed in a first frame for an interactive geographic map 702. Each label has a respective bounding box that defines a perimeter within which the label will be placed and a respective initial buffer space that describes a region surrounding the respective bounding box within which other labels cannot be placed.

The computing device determines that the first and second labels were displayed in a previously drawn frame for the interactive geographic map 704. The computing device generates, using respective initial buffer spaces, respective reduced buffer spaces for the first and second labels 706. The computing device places the first and second labels in the first frame for the interactive geographic map based on their respective reduced buffer spaces 708.

Figure 8:
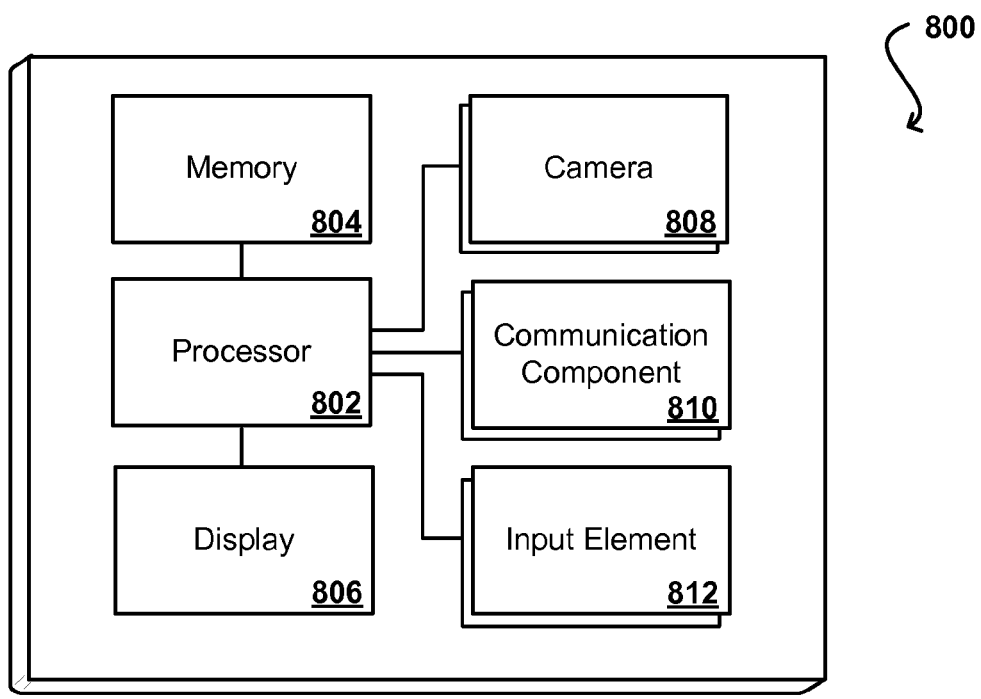
FIG. 8 illustrates example components of a client device.

FIG. 8 illustrates a logical arrangement of a set of general components of an example computing device 800 such as the device 502 described in reference to FIG. 5. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for generating a bounding box for a map label, the method comprising:
   receiving, from a map search system and in response to a map search query, map data that describes a geographic region, the map data including a collection of map labels that each describe a respective feature that is located in the geographic region, each map label comprising one or more text characters, and wherein each map label is associated with a respective popularity score;
   generating, for each map label in the collection of map labels, a respective bounding box having a width and a height, and wherein an area for the bounding box is the same as an area for the map label, wherein each bounding box is associated with a respective initial buffer space that includes the respective bounding box and some additional area beyond the respective bounding box, the initial buffer space defining an area within which other maps labels cannot be placed;
   determining that a first map label and a second map label, from the collection of map labels, were displayed in a previously presented frame for a map representing the geographic region;
   receiving a request to display a new frame for the map;
   determining, for the first map label, a first reduced buffer space, the first reduced buffer space being determined by reducing an initial buffer space of a first bounding box for the first map label by a first predetermined amount, the initial buffer space of the first bounding box including both the first bounding box and a first additional area beyond the first bounding box, the first reduced buffer space including both the first bounding box and a second additional area beyond the first bounding box, the second additional area being less than the first additional area;
   determining, for the second map label, a second reduced buffer space, the second reduced buffer space being determined by reducing an initial buffer space of a second bounding box for the second label by a second predetermined amount, the initial buffer space of the second bounding box including both the second bounding box and a third additional area beyond the second bounding box, the second reduced buffer space including both the second bounding box and a fourth additional area beyond the second bounding box, the fourth additional area being less than the third additional area; and
   generating, using the map data and the first and the second map labels, the new frame for the map, the new frame including the first and the second map labels, wherein the first map label is disposed within an area defined by the first bounding box, wherein the first bounding box lies within the first reduced buffer space, and
   wherein the second map label is disposed within an area defined by the second bounding box, wherein the second bounding box lies within the second reduced buffer space.

2. The computer-implemented method of claim 1, further comprising:
   determining, for each map label in the collection of map labels, a respective width based on a sum of respective widths of each text character in the one or more text characters for the map label, the width including respective widths of whitespace in the map label;
   determining, for each map label in the collection of map labels, a respective height based on a height of a tallest text character in the one or more text characters for the map label; and
   determining, for each map label in the collection of map labels, a respective area based on a product of the respective width and the respective height.

3. The computer-implemented method of claim 2, further comprising:
   determining, for each map label in the collection of map labels, a respective line wrapping for fitting the one or more characters of the map label within the area of the respective bounding box for the map label.

4. The computer-implemented method of claim 1, wherein the width of the first bounding box is two times the height of the first bounding box.

5. The computer-implemented method of claim 2, wherein determining, for the first map label, the first reduced buffer space, the first reduced buffer space being determined by reducing the initial buffer space of the first bounding box for the first map label by the first predetermined amount further comprises:
   identifying a feature in the new frame for the map that is being described by the first map label;
   determining that the first bounding box does not fit within a boundary of the identified feature in the new frame for the map; and
   generating, for the first label, a resized bounding box that fits within the boundary of the identified feature.

6. A computing device comprising:
   one or more processors; and
   memory storing instructions that, when executed by the one or more processors, cause the computing device to perform operations, comprising:
      determining, for a first label, an area for the first label;
      determining, for the first label, a first bounding box that satisfies an aspect ratio and that has an area that is the same as the area for the first label, the first bounding box being associated with a first initial buffer space that includes both the first bounding box and a first additional area beyond the first bounding box, the first initial buffer space describing a region surrounding the first bounding box within which other labels cannot be placed;
selecting the first label and a second label to be included in a map representing a geographic region, and the second label having a second bounding box, the second bounding box being associated with a second initial buffer space that includes both the second bounding box and a second additional area beyond the second bounding box, the second initial buffer space describing a region surrounding the second bounding box within which other labels cannot be placed;
determining that there is an overlap between the first initial buffer space and the second initial buffer space;
generating, for the second label, a reduced buffer space using the second initial buffer space of the second label, the reduced buffer space including both the second bounding box and a third additional area beyond the second bounding box, the third additional area being less than the second additional area; and
placing the first and the second labels in the map, wherein the first label is placed in the map based on the first initial buffer space, and wherein the second label is placed in the map based on the reduced buffer space.

7. The device of claim 6, wherein determining the area for the first further comprises:
determining a width for the first label based on a sum of respective widths of each character in the text for the first label;
determining a height of a tallest character in the text for the first label; and
determining the area for the first label based on a product of the width and the height.

8. The device of claim 7, further comprising:
determining a layout of text for the first label based on the area of the first bounding box and the aspect ratio of the first bounding box, wherein the layout is determined using a line wrapping technique.

9. The device of claim 6, wherein generating, for the second label, the reduced buffer space using the second initial buffer space of the second label further comprises:
determining, for the second label, the second reduced buffer space by reducing the second initial buffer space by a first percentage based on a category of a feature that is being described by the second label.

10. The device of claim 6, wherein generating, for the second label, the reduced buffer space using the second initial buffer space of the second label further comprises further comprises:
identifying a feature in the map that is being described by the second label;
determining that the second bounding box does not fit within a boundary of the identified feature in the map; and
generating, for the second label, a resized bounding box that fits within the boundary of the identified feature.

11. The device of claim 10, wherein generating, for the second label, the resized bounding box that fits within the boundary of the identified feature further comprises:
adjusting one or more dimensions of the second bounding box to add at least one new line; and
determining a line wrapping for fitting the second label in an area defined by the resized bounding box.

12. The device of claim 6, wherein the aspect ratio defines a width of the first bounding box that is two times a height of the first bounding box.

13. A computer-implemented method for placing labels in an interactive geographic map, the method comprising:
selecting a first label and a second label to be placed in a first frame for a map, the first label having a first bounding box that defines a first perimeter within which the first label will be placed, the first bounding box being associated with a first initial buffer space that describes a region surrounding the first bounding box within which other labels cannot be placed, the first initial buffer space including both the first bounding box and a first additional area beyond the first bounding box, the second label having a second bounding box that defines a second perimeter within which the second label will be placed, and the second bounding box being associated with a second initial buffer space that describes a region surrounding the second bounding box within which other labels cannot be placed, the second initial buffer space including both the second bounding box and a second additional area beyond the second bounding box;
determining that the first and the second labels were displayed in a previously presented frame for the map;
generating a first reduced buffer space using the first initial buffer space, the first reduced buffer space including both the first bounding box and a third additional area beyond the first bounding box, the third additional area being less than the first additional area;
generating a second reduced buffer space using the second initial buffer space, the second reduced buffer space including both the second bounding box and a fourth additional area beyond the second bounding box, the fourth additional area being less than the second additional area; and placing the first label in the first frame for the map based on the first reduced buffer space, and placing the second label in the first frame for the map based on the second reduced buffer space.

14. The computer-implemented method of claim 13, wherein generating, the first reduced buffer space using the first initial buffer space and generating the second reduced buffer space using the second initial buffer space further comprises:
determining, for the first label, the first reduced buffer space by reducing the first initial buffer space for the first label by a first percentage based on a category of a feature that is being described by the first label; and
determining, for the second label, the second reduced buffer space by reducing the second initial buffer space for the second label by a second percentage based on a category of a feature that is being described by the second label.

15. The computer-implemented method of claim 13, wherein generating, the first reduced buffer space using the first initial buffer space and generating the second reduced buffer space using the second initial buffer space further comprises:
determining, for the first label, the first reduced buffer space by reducing the first initial buffer space for the first label by a first percentage; and
determining, for the second label, the second reduced buffer space by reducing the second initial buffer space for the second label by a second percentage.

16. The computer-implemented method of claim 13, wherein generating, the first reduced buffer space using the first initial buffer space and generating the second reduced buffer space using the second initial buffer space further comprises:

determining, for the first label, the first reduced buffer space by reducing the first initial buffer space for the first label by a first numerical value; and determining, for the second label, the second reduced buffer space by reducing the second initial buffer space for the second label by a second numerical value.

17. The computer-implemented method of claim 13, wherein placing the first label in the first frame for the map based on the first reduced buffer space, and placing the second label in the first frame for the map based on the second reduced buffer space further comprises:

determining that the first reduced buffer space and the second reduced buffer space do not overlap; and placing, in the first frame for the map, the first label within the first perimeter defined by the first bounding box and the second label within the second perimeter defined by the second bounding box.

18. The computer-implemented method of claim 13, further comprising:

selecting, in response to a user interaction with the first frame for the map, the first label and a third label to be placed in a second frame for the map, the third label having a third bounding box that defines a third perimeter within which the third label will be placed and a third initial buffer space that describes a region surrounding the third bounding box within which other labels cannot be placed;

determining that the third label was not displayed in the previously presented frame for the map; and placing, in the second frame for the map, the first label based on the first initial buffer space and the third label based on the third initial buffer space.

19. The computer-implemented method of claim 18, wherein placing, in the second frame for the map, the first label based on the first initial buffer space and the third label based on the third initial buffer space further comprises:

determining that the first initial buffer space for the first label and the third initial buffer space for the third label do not overlap; and placing, in the second frame for the map, the first label based on the first initial buffer space and the third label based on the third initial buffer space.

20. The computer-implemented method of claim 18, wherein placing, in the second frame for the map, the first label based on the first initial buffer space and the third label based on the third initial buffer space further comprises:

determining that the first initial buffer space for the first label and the third initial buffer space for the third label overlap; and placing the first label, and not placing the third label, in the second frame for the map.

\* \* \* \* \*